United States Patent
Chitre et al.

(10) Patent No.: US 9,332,574 B2
(45) Date of Patent: May 3, 2016

(54) PSEUDO HOLD MODE TO SIMULATE CONTINUOUS CONNECTIVITY TO A MOBILE DEVICE

(71) Applicant: Cellco Partnership, Basking Ridge, NJ (US)

(72) Inventors: Monica Chitre, Watchung, NJ (US); Yoganand Rajala, Suwanee, GA (US); Peter C. Bates, Morristown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 268 days.

(21) Appl. No.: 14/056,398

(22) Filed: Oct. 17, 2013

(65) Prior Publication Data
US 2014/0106719 A1    Apr. 17, 2014

Related U.S. Application Data

(60) Provisional application No. 61/715,257, filed on Oct. 17, 2012.

(51) Int. Cl.
| H04M 11/04 | (2006.01) |
| H04W 76/00 | (2009.01) |
| H04W 76/04 | (2009.01) |
| H04W 76/02 | (2009.01) |

(52) U.S. Cl.
CPC .......... *H04W 76/007* (2013.01); *H04W 76/045* (2013.01); *H04W 76/028* (2013.01)

(58) Field of Classification Search
CPC ............ H04W 76/007; H04W 64/001; H04W 64/003; H04W 4/02; H04W 4/22
USPC .............. 455/404.1, 404.2, 456.1, 456.2, 521
See application file for complete search history.

(56) References Cited

U.S. PATENT DOCUMENTS

| 5,689,548 A | 11/1997 | Maupin et al. |
| 7,333,818 B2 * | 2/2008 | Dunn ................ H04M 1/72536 379/374.01 |
| 7,587,031 B1 | 9/2009 | Ress et al. |
| 8,811,964 B2 * | 8/2014 | Fish ..................... H04M 3/5116 455/404.1 |
| 2002/0065063 A1 | 5/2002 | Uhlik et al. |
| 2005/0085257 A1* | 4/2005 | Laird ....................... A61B 5/04 455/550.1 |
| 2005/0153681 A1* | 7/2005 | Hanson ................ G08B 25/016 455/404.2 |
| 2012/0028597 A1* | 2/2012 | Chmielewski ........ B60R 25/102 455/404.1 |
| 2012/0052836 A1 | 3/2012 | Buratti et al. |
| 2012/0307621 A1 | 12/2012 | Zawaideh et al. |
| 2013/0122932 A1* | 5/2013 | Patel ....................... H04W 4/02 455/456.2 |
| 2013/0244608 A1 | 9/2013 | Malik et al. |
| 2014/0376414 A1* | 12/2014 | Edge .................. H04L 65/4007 370/259 |
| 2015/0140951 A1* | 5/2015 | Darling ............... H04L 12/6418 455/404.1 |
| 2015/0230055 A1* | 8/2015 | Smith ................... H04W 64/00 455/456.3 |

* cited by examiner

Primary Examiner — Temica M Beamer

(57) ABSTRACT

A method of establishing a persistent emergency call and positional indication of the call is provided. Upon a call center receiving a call by a user equipment (UE) device, a request for a the UE device to perform a function, such as provide its current location, is issued and a pseudo hold mode initiated by temporarily severing the voice call. The user of the UE device is aware of the pseudo hold mode but unaware of the call termination. While on the pseudo hold mode, the current location is determined, the call is subsequently reestablished and the pseudo hold mode terminated.

20 Claims, 7 Drawing Sheets

PSEUDO HOLD MODE TO SIMULATE CONTINUOUS CONNECTIVITY TO A MOBILE DEVICE

BACKGROUND

In recent years, mobile devices have increasingly provided users with functions unrelated to a communication with another device, such as document editing, web surfing, playing audio files and capturing digital images. In some instances, the use of the mobile device to perform one of these functions is inconsistent with the communications function of the device. For example, in addition to being able to wirelessly contact another individual or service by dialing a number, mobile devices can be used as part of a Personal Emergency Response Systems (PERS). PERS devices and equipment are user-installed devices (wired or wireless) that may also attach to a landline network. The general concept is that the PERS user is able to provide location information for general monitoring and/or to alert an emergency response call center that they are in distress and need immediate assistance. It may not be possible for the PERS system to detect the location of the mobile device while maintaining a voice connection. Some PERS devices are capable of detecting events such as falls or extended periods of inactivity and alert the call center to these conditions. Regardless of the specific type of PERS device, the location of the mobile device is an important determination.

In modern mobile communication networks, the current position determination technologies use several methods of determining a subscriber's location before it defaults to the location of the serving sector. One such technology is Global Positioning System (GPS). GPS is a space-based satellite navigation system that provides location and time information anywhere on Earth, where there is an unobstructed line of sight to four or more GPS satellites. Standalone GPS operation uses radio signals from satellites alone. On the other hand, Assisted GPS (AGPS) additionally uses network resources to locate and use the satellites in poor signal conditions. For example, when signal conditions are poor (e.g., in a city or building), these signals may suffer multipath propagation where signals bounce off buildings, or may be weakened by passing through atmospheric conditions, walls, or tree cover. When a GPS location determination is attempted in these conditions, some standalone GPS navigation devices may not be able to fix a position due to the poor signal quality. A fix may take several minutes (if at all possible) rendering them unable to function effectively until a clearer signal can be received continuously for a long enough period of time. An assisted GPS system can address these problems by using data available from a network. For example, servers that include orbital information from satellites are used. A mobile device can contact such servers and download the information using a "secure user plane location" approach, which is an IP based protocol for AGPS to receive information of GPS satellites via IP.

Determining the location of a mobile device while the mobile device is in use is often problematic. A mobile device may not be able to be assisted in determining its location because the communication channel is preoccupied with voice communication. For example, some wireless technology, (e.g., CDMA) does not support simultaneous voice and IP data communication. Thus, the call would first have to be stopped in order for the mobile device to determine its location efficiently.

Accordingly, it would also be beneficial to have a method and system to determine the location of a mobile device while a mobile device is in use, without providing an impression to the user that an on-going call is severed.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the examples described below concern the use of a mobile device to provide location information in an emergency while maintaining a voice channel with a call center, other uses of the system are contemplated. For example, the system may allow a user to initiate an Internet search during a voice call to the call center. Alternatively, two users having similar applications on their mobile devices may maintain a voice channel between them while one or both parties use the mobile device or its telecommunications facilities to perform another function which conflicts with the use of the voice channel by the mobile devices. In one example, a user who calls his doctor's office may be put on pseudo hold while the doctor obtains physiological data via an Internet connection established in the same communication channel as the voice call. In this example, the mobile device may include physiological sensors, such as a blood pressure sensor or a heart monitor or it may be able to access data stored local to the mobile device such as insulin levels for previously conducted blood tests. In another example, an insurance claims representative may place a client who has recently been in an accident on pseudo hold to obtain images of the damaged vehicle or accident scene from the camera of the mobile device. In yet another example, one user may call another user and, without explicitly terminating the call, engage a pseudo-hold mode. While in the pseudo-hold mode, the user may perform another function, such as engaging in an Internet search. Upon terminating the Internet search the user may terminate the pseudo-hold mode and continue the conversation with the other party.

The various examples disclosed herein relate to determining and/or tracking the location of a mobile device after the mobile device has established a communications channel with a call center. Different localization techniques are used to determine the location of the mobile device. The location information is then transmitted to a central server.

Figure 1:
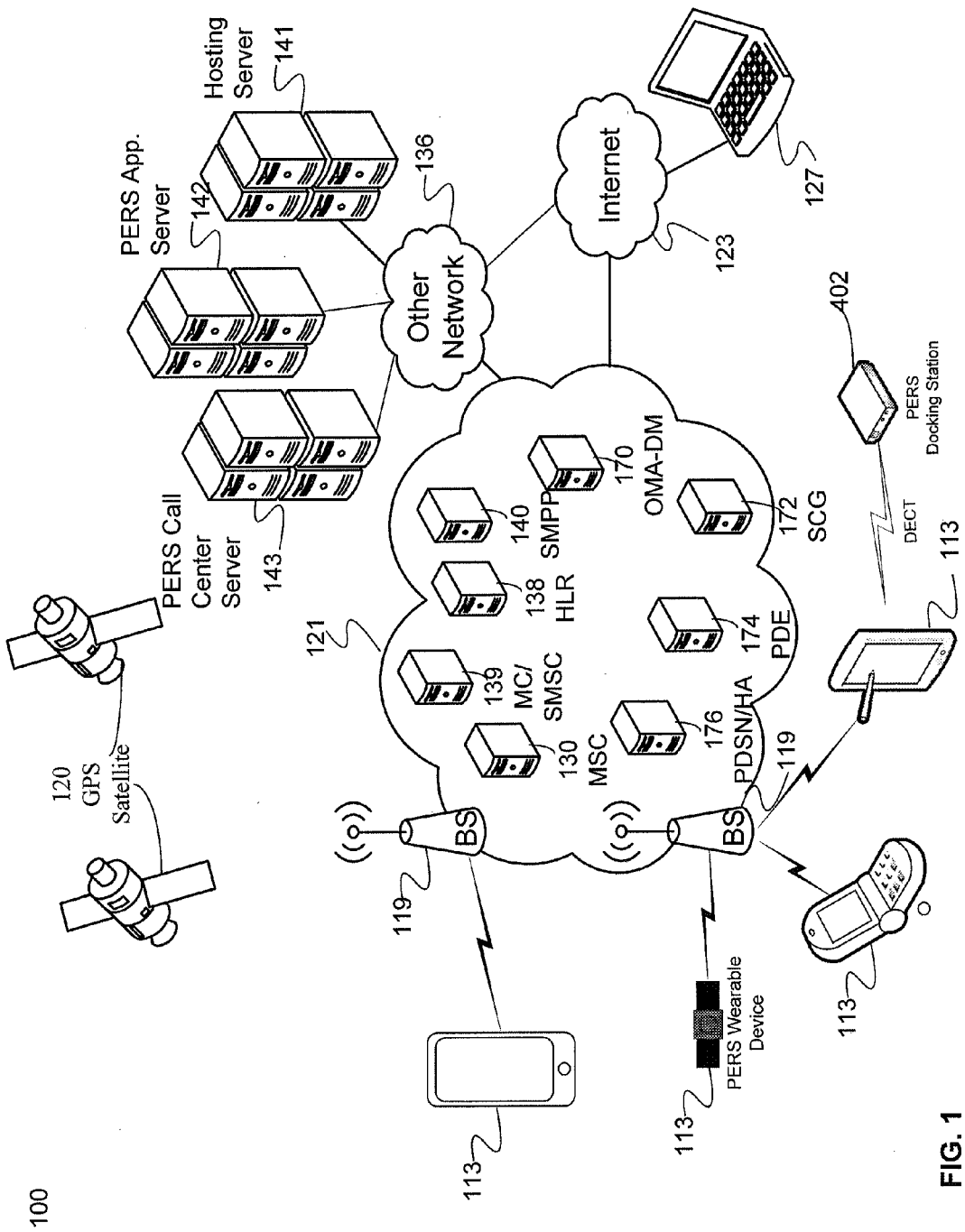
FIG. 1 illustrates a system offering an exemplary framework to determine the location of a mobile device.

Reference now is made in detail to the examples illustrated in the accompanying drawings and discussed below. FIG. 1 illustrates a mobile communication network 100 as may be operated by a carrier or service provider to provide a wide range of mobile communication services and ancillary services or features to its subscriber customers and associated mobile device users. The elements collectively indicated by the reference numeral 100 generally are elements of the network and are operated by or on behalf of the carrier and third party service provider, although the mobile devices may be sold to and owned by the carrier's customers. The mobile communication network 100 provides communications between mobile devices as well as communications for the mobile devices with networks and stations (not shown) outside the mobile communication network 100.

The wireless mobile communication network 100 might be implemented as a network conforming to the code division multiple access (CDMA) IS-95 standard, the 3rd Generation Partnership Project 2 (3GPP2) wireless IP network standard or the Evolution Data Optimized (EVDO) standard, a time division multiple access (TDMA) standard or other standards used for public mobile wireless communications. In one example, the mobile devices may be capable of conventional voice telephone communications and data communications.

For purposes of later discussion, several user equipment (UE) or mobile devices 113 appear in the drawing, to represent examples of the UE devices that may receive various services via the mobile communication network 100. In the materials that follow, the terms UE device and mobile device are used interchangeably and include a wearable PERS device. UE devices 113 can take the form of portable handsets, smart-phones, tablets, personal digital assistants, or mobile devices 113, although they may be implemented in other form factors. In one example, mobile devices 113 can include media content. The media content can be configured to execute on many different types of UE devices 113. For example, a mobile device application can be written to execute on a binary runtime environment for mobile (BREW-based) UE device. In further instances, a mobile device application can be written to execute on a Windows Mobile based mobile device, Android, I-Phone, Java Mobile, or RIM based mobile device such as a BlackBerry or the like. The mobile environment may support PERS applications or, alternatively, the UE devices 113 may be a PERS wearable device. In one example, a PERS wearable device may be configured to have a help button on the device and a user of the PERS wearable device 113 may call the personal emergency response system by pressing the help button in an emergency state. Help may also be invoked through an audio input of the PERS wearable device 113, a predetermined motion of the device, the output signal of a physiological sensor coupled to the PERS device 113 indicating a potential emergency condition or any combination thereof.

The mobile communication network 100 can be implemented by a number of interconnected networks. Hence, the overall network 100 may include a number of radio access networks (RANs), as well as regional ground networks interconnecting a number of RANs and a wide area network (WAN) interconnecting the regional ground networks to core network elements. A regional portion of the network 100, such as that serving mobile devices 113, can include one or more RANs and a regional circuit and/or packet switched network and associated signaling network facilities.

Physical elements of a RAN operated by one of the mobile service providers or carriers include a number of base stations represented in the example by the base stations (BSs) 119. Although not separately shown, such a base station 119 can include a base transceiver system (BTS), which can communicate via an antennae system at the site of base station and over the airlink with one or more of the mobile devices 113, when the mobile devices are within range. Each base station can include a BTS coupled to several antennae mounted on a radio tower within a coverage area often referred to as a "cell." The BTS is the part of the radio network that sends and receives RF signals to/from the mobile devices 113 that are served by the base station 119.

The radio access networks can also include a traffic network represented generally by the cloud at 121, which carries the user communications and data for the mobile devices 113 between the base stations 119 and other elements with or through which the mobile devices communicate. In some examples, the mobile traffic network 121 includes network elements that support mobile device media content transfer services such as mobile switching centers (MSCs) 130, Open Mobile Alliance (OMA) Device Management (DM) Working Group and the Data Synchronization (DS) Working Group servers 170. The network can also include other elements that support functionality other than media content transfer services such as messaging service messages and voice communications. Examples of other network elements that may be used in support of messaging service message communications include, but are not limited to, message centers (MCs) 139, home location registers (HLRs) 138, simple messaging service point-to-point (SMPP) gateway 140, and other network elements such Service Control Gateway (SCG) 172, Position Determining Entity (PDE) 174, and gateway Packet Data Serving Node/Home Agent (PDSN/HA) 176. The PDE 174 communicates with an appropriately equipped mobile device 113 to determine the location of the mobile device 113, and for non-emergency services, a Location gateway (LGW) (not shown) makes that information accessible to various user applications, including some applications that reside on mobile stations. Hence, the location determination software in the mobile device 113 enables that station to obtain the location information by working with elements of a location based service (LBS) platform of the mobile wireless communication network, such as the PDE 174.

Thus, the PDE 174 is a network element that manages the position or geographic location determination of each mobile device 113. In some examples, network 100 utilizes an assisted GPS (AGPS) approach to the determination of mobile station location, in which the mobile device 113, takes measurements of signals from a number of GPS satellites 120 (only two of which are shown, for convenience) and interacts with the PDE 174 to process those measurements so as to determine the latitude and longitude (and possibly altitude) of the current location of the mobile device 113. The PDE system 174 is essentially a general purpose programmable device with an interface for data communication via the network 121 running server software and running programming for implementation of the PDE functions. The PDE 174 stores (e.g., in cache memory) or has access to a complete and up to date set of the satellite data for the constellation of GPS satellites 120 needed to allow computation of position based on pseudorange measurements from satellite signals. The data may include that associated with the entire constellation but will at least include the data for the satellites expected to be broadcasting into the geographic region serviced by the network 121.

When a mobile device 113 attempts a GPS position fix, the mobile device 113 provides information allowing the PDE 174 to perform a pre-fix. Typically, the mobile device 113 will provide data identifying the base station 119 through which it is receiving service (and possibly the serving sector). In some implementations, the PDE 174 may receive data regarding several base stations/sectors and signal strengths thereof, for trilateration. The PDE 174 uses information about base station location(s) to process the data received from the mobile device 113 so as to determine a region (e.g., area of the cell or sector, or a general area triangulated based on signals from several base stations) that the mobile device is likely located within. The PDE 174 then uses the pre-fix location to parse the satellite data down, to assistance data that the mobile device 113 at the particular location needs in order to take GPS readings. The PDE 174 sends the parsed satellite data to the mobile device, e.g., to target mobile device 113, for use in taking measurements of signals from appropriate satellites 120. The GPS assistance data may contain selected satellite almanac, satellite visibility, Doppler, and clock correction information.

The mobile device 113, in turn, uses this information (also known as acquisition assistance records) to take multiple satellite pseudorange measurements. Depending on the device/network configuration, the mobile device 113 or the PDE 174 can then calculate a final fix using these pseudorange measurements. The final fix computation provides latitude and longitude (and possibly altitude) coordinates for the current location of the mobile device 113. If the mobile device 113 has full GPS computation capability, the station 119 would know its current latitude and longitude and would communicate that data to the PDE 174 through the network 121. In many cases, however, the mobile device 113 has only measurement capability, and the mobile device forwards the measurement data to the PDE 174 to determine the final fix. In either case, the GPS processing leads to a situation in which the PDE 174 knows the latitude and longitude of the mobile device 113. If necessary, the PDE 174 can provide coordinates to the mobile device 113.

As to the SCG 172, it functions to allow software applications, e.g., third-party applications (shown by servers 141 to 143), to send requests to locate mobile devices 113. Such software applications can be resident on the mobile device 113 itself or resident on another platform.

As mentioned above, the network 121 also includes one or more of Packet Data Serving Nodes or "PDSNs" 176. The PDSN 176 is a fixed network element introduced in the architectures for 3G networks, to support packet-switched data services. Each PDSN 176 establishes, maintains and terminates logical links to the associated portion of the radio access network 121. The PDSNs also support point to point (PPP) sessions with the mobile devices 113. The PSDNs 176 provide the packet routing function from the radio network to/from other packet switched networks, represented generally by the other network 136 and the Internet 123, in FIG. 1.

Figure 2:
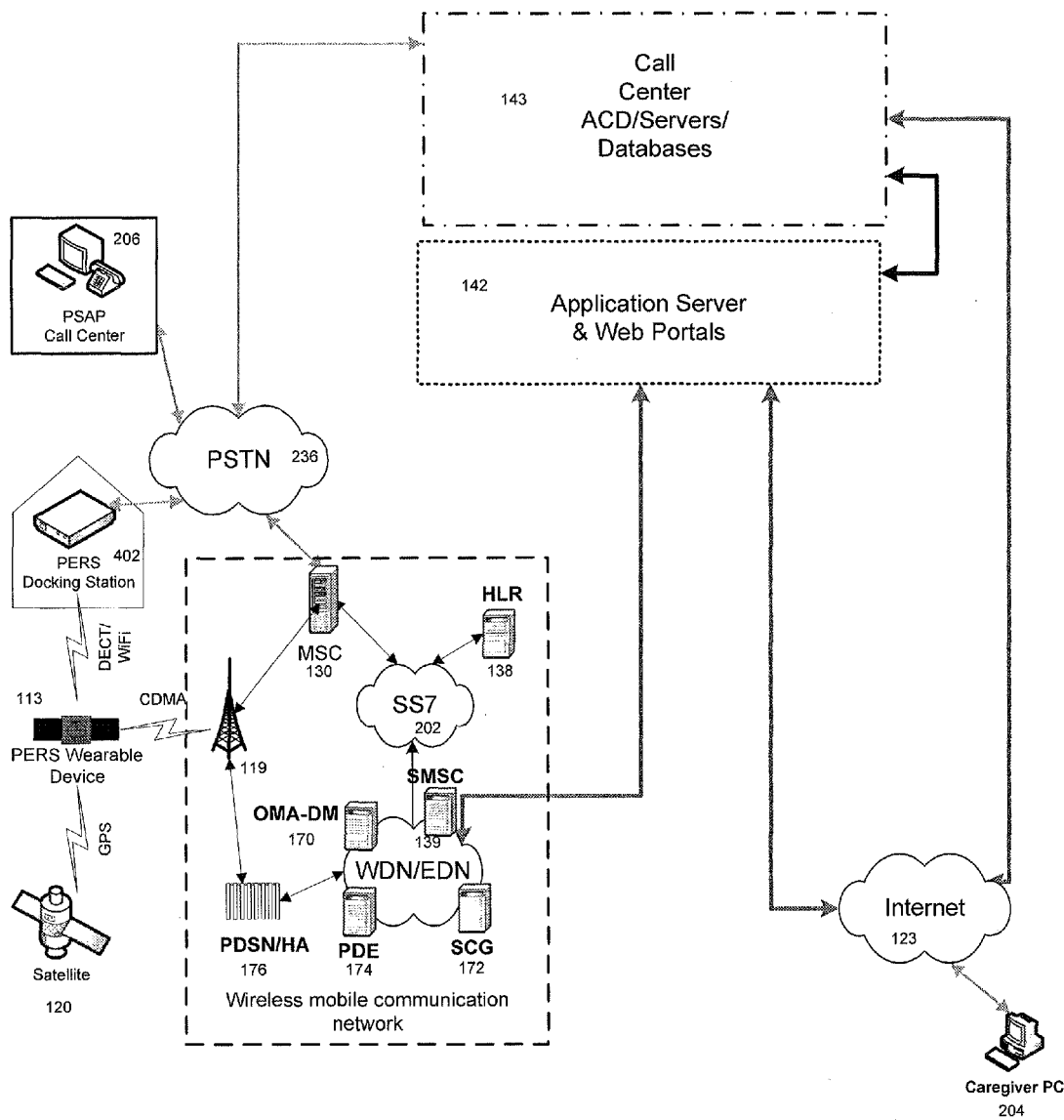
FIG. 2 illustrates a more detailed view of system offering an exemplary framework to determine the location of a mobile device.

Other individual elements such as switches and/or routers forming the traffic network 121 are omitted here for simplicity. It will be understood that the various network elements can communicate with each other and other aspects of the mobile communications network 110 and other networks, e.g., the public switched telephone network (PSTN) 236 as shown in FIG. 2, and the Internet 123, either directly or indirectly.

The mobile switching center (MSC) 130 is responsible for managing communications between the mobile device and the other elements of the network 110. In addition, the MSC 130 is responsible for handling voice calls and messaging service message requests as well as other services (such as conference calls, FAX and circuit switched data, messaging service communications, Internet access, etc.). The MSC 130 sets up and releases the end-to-end connection or session, and handles mobility and hand-over requirements during the call. The MSC 130 also routes messaging service messages to/from the mobile devices 13, typically from/to an appropriate MC 139. The MSC 130 is sometimes referred to as a "switch". The MSC 130 manages the cell sites, the voice trunks, voicemail, and SS7 links 202, as shown in FIG. 2.

In one example, the message center (MC) 139, in some examples, allows messaging service messages to be exchanged between mobile devices and other networks. For SMS messaging, for example, the MC 139 receives packet communications containing text messages from originating mobile devices and forwards the messages via the signaling resources and the signaling channels to the appropriate destination mobile devices. The MC 139 may receive messages from external devices for similar delivery to mobile devices, and the MC 139 may receive similar messages from the mobile devices and forward them to servers or terminal devices, in either case, via an Internet Protocol (IP) packet data network.

In some examples, the MC 139 can also be considered or include functionality that may be considered that of a Short Messaging Service Message Center (SMSC) or a Message Register (MR). Wireless carriers developed the short message service (SMS) to transmit text messages for display on the mobile devices. In many existing network architectures, the SMS traffic uses the signaling portion of the network 121 to carry message traffic between a Short Message Service Center (SMSC) 139 and the mobile devices. The SMSC 139 supports mobile device to mobile device delivery of text messages. However, the SMSC 139 also supports communication of messages between the mobile devices and devices coupled to other networks. For example, the SMSC 139 may receive incoming IP message packets from the Internet 123 for delivery via the network 121, one of the base stations 119 and a signaling channel over the air link to a destination mobile device. For this later type of SMS related communications, the network 110 also includes one or more Short Message Peer-to-Peer (SMPP) protocol gateways 140.

In other examples, the MC 139 can include functionality related to the Enhanced Messaging Service (EMS) or Multimedia Messaging service (MMS). An EMS message can have special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile devices. In some examples, the MC 139 can be considered in whole or in part a multimedia messaging service center (MMSC).

Although a single MC 139 is shown, network 100 can have many geographically dispersed MCs 139. The MCs 139 can include destination routing tables (DRTs). In essence the DRTs are databases within the MCs 139. A DRT contains a list of the MDNs which are associated with the various MCs 139. For example, a first MDN is associated with a MC 139 in California while a second MDN is associated with a MC 139 in Virginia. The DRTs are used to determine which MC 139 should attempt to deliver an incoming messaging service message to the destination MDN. For example, if a user associated with the MC in California sends an SMS to a user associated with the MC 139 in Virginia, the California MC 139 sends the SMS to the Virginia MC 139 for delivery to the destination MDN. The communication among the MCs 139 occurs using know protocols such SMPP and the like.

The HLR 138, in some examples, stores a subscriber profile for each of the wireless subscribers and their associated mobile devices 113. The HLR 138 may reside in an MSC 130 or in a centralized service control point that communicates with the MSC(s) 130 via an out-of-band signaling system such as an SS7 network 202 as shown in FIG. 2. The HLR 138 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 138 can also be a stand-alone device. The HLR also tracks the current point of attachment of the mobile device to the network, e.g., the identification of the MSC 130 with which the mobile device is currently registered to receive service.

The SMPP gateway 140 provides functionality to transport messaging service messages to other mobile communication networks and also receive messaging service messages from other networks. The SMPP gateway 140 supports communications using the SMPP protocol. SMPP gateways 140 are Short Message Peer-to-Peer (SMPP) gateways 140 used to connect the wireless communication network (such as an Internal Protocol IP network on the left of the SMPP Gateway 140 in FIG. 1) to another network (such as a public Internet network on the right of the SMPP Gateway 140 in FIG. 1). The SMPP Gateway 140 allows the MC 139 to receive and send messages in IP packet format. The SMPP Gateway 140 is an entity within the wireless network 100 that acts as an intermediary between the wireless service provider network and other networks. For example, the SMPP Gateway 140 converts messages in protocol(s) used by other applications and devices, e.g. Extensible Markup Language (XML), Hypertext Mail Protocol (HTMP), etc., to and from the SMPP protocol. The SMPP messages ride on IP transport, e.g., between the SMPP Gateway 140 and the MC 139.

In addition, the traffic network portion 121 of the mobile communications network 100 connects to the other network 136. The other network in one example, may be a private data network. The private data network connects to the traffic network portion 121 via a gateway (not shown). The gateway can provide protocol conversions between the protocols used by the traffic network 121 and the protocols used by the private data network 136.

The private data network 136 can be in communication with various auxiliary services servers, e.g., such as those providing additional services to the users of the network 100, and/or to operations support personnel of the service provider or carrier that operates the network 100. For example, the carrier can also offer its subscribers on-line access to a variety of functions related to the subscribers' accounts, such as a log of location information, personal health information personal information, account information (e.g., passwords, preferences, etc.) or the like. For that purpose, the carrier can operate a "PERS Call Center" server 143 via the other network 136. Hence, a user's terminal, such as PC 127, may be used to access on-line information about a subscriber's account, which the mobile carrier makes available via the carrier's web site accessible through the Internet 123. In one example other network 136 is part of the Internet 123.

In addition, a "PERS Application" server 142, and a hosting server 141 can be provided in communication with the private data network 136. For example, the PERS Application server 142 can provide settings, mobile device events (e.g., when an emergency occurred), location history information of the mobile device 113, and the like. The hosting server 141 is a caregiver portal application and troubleshooting portal application hosting server. For discussion purposes, each of the hosting 141, PERS Application, and Call Center Server can be a standalone computing device such as a server or be on a single server. Thus, the functionality described herein with respect to each of the servers 141, 142, and 143 can also be provided by one or multiple different computing devices.

FIG. 2 provides a high level description of an exemplary framework to determine the location of a mobile device.

In one example, mobile device 113 may initiate a call to the call center requesting emergency services. The wireless network (e.g., carrier's wireless communication network) may relay the call to the call center via the PSTN network 236, as shown in FIG. 2.

The App server 142 may record and update the status of the call upon receiving an indication from the call center server 143. Upon establishing a connection to the call center, caregiver PC 204 or an agent may be notified of the established call and may then request a location of the mobile device via Internet 123. Upon receiving the request, the mobile device may first perform a GPS fix using data from satellite 120. However, the satellite signal may be poor, due to obstructions such as large buildings, trees, etc. An assisted GPS (AGPS) system can address these problems by using data available from a network (e.g., the carrier's wireless communication network). Thus, the mobile device may rely on AGPS using wireless network resources to help the mobile device determine the mobile device location. For example, servers (e.g. PDE 174) in the network that include almanac and ephemeris data for the satellites may be used. Mobile device 113 may contact the servers and download the information. The mobile device will still receive at least some GPS satellite signals for processing to determine location, however, the network assistance may help expedite final resolution of device location and/or a reasonably accurate determination using fewer or weaker received satellite signals. In one example, both GPS and AGPS may fail to provide the location information because of a substantial degradation of signals. In such a scenario, if the user of the mobile device is in the vicinity of docking station 402, the user or the system may then provide the location or the registered address of the docking station.

In one implementation, the mobile device may be a PERS wearable device 113 (as discussed above). As such, an emergency situation such as a heart attack, a collision or a fall or GPS coordinates corresponding to a danger zone, detected at the PERS wearable device, may automatically initiate a call to the call center.

The user of the caregiver PC 204 or an agent may then access the location information via a global information network (e.g., the Internet 123) from the call center server. In one example, the call center agent may also receive personal information about the user of the mobile device and a coarse location of the mobile device 113 (e.g., based on the wireless network cell sector address) that may be used to select a Public Safety Answering Point (PSAP) call center 206. For example, the personal information may be stored in a database (e.g., a public database or a private database) of the server. The database may be created during an initial service setup between the call center and the user. During the setup, a user identification value may be obtained from the user and stored in the database. This value may be used later to index the database in order to retrieve the user's stored personal information. For example, the agent of the caregiver PC 204 may have the telephone number of the PSAP call center 206 based on the location personal information and the coarse location of the user. The agent may contact the PSAP call center in order to relay the status (e.g., an emergency situation) and location of the user to a PSAP operator, so that the PSAP operator can provide immediate support to the user. In one example, the PERS device may also communicate with an accessory, such as a heart monitor, associated with the user, which may already have the user identification. This communication may be implemented by the PSAP call center engaging a pseudo hold mode, as described below, and establishing an Internet protocol (IP) session with the mobile device 113. Thus, upon communicating with the accessory (e.g., the heart monitor), the PERS device may acquire the user identification and transfer the user identification to the call center. In such a scenario, the PERS device may not store the user identification.

Figure 3:
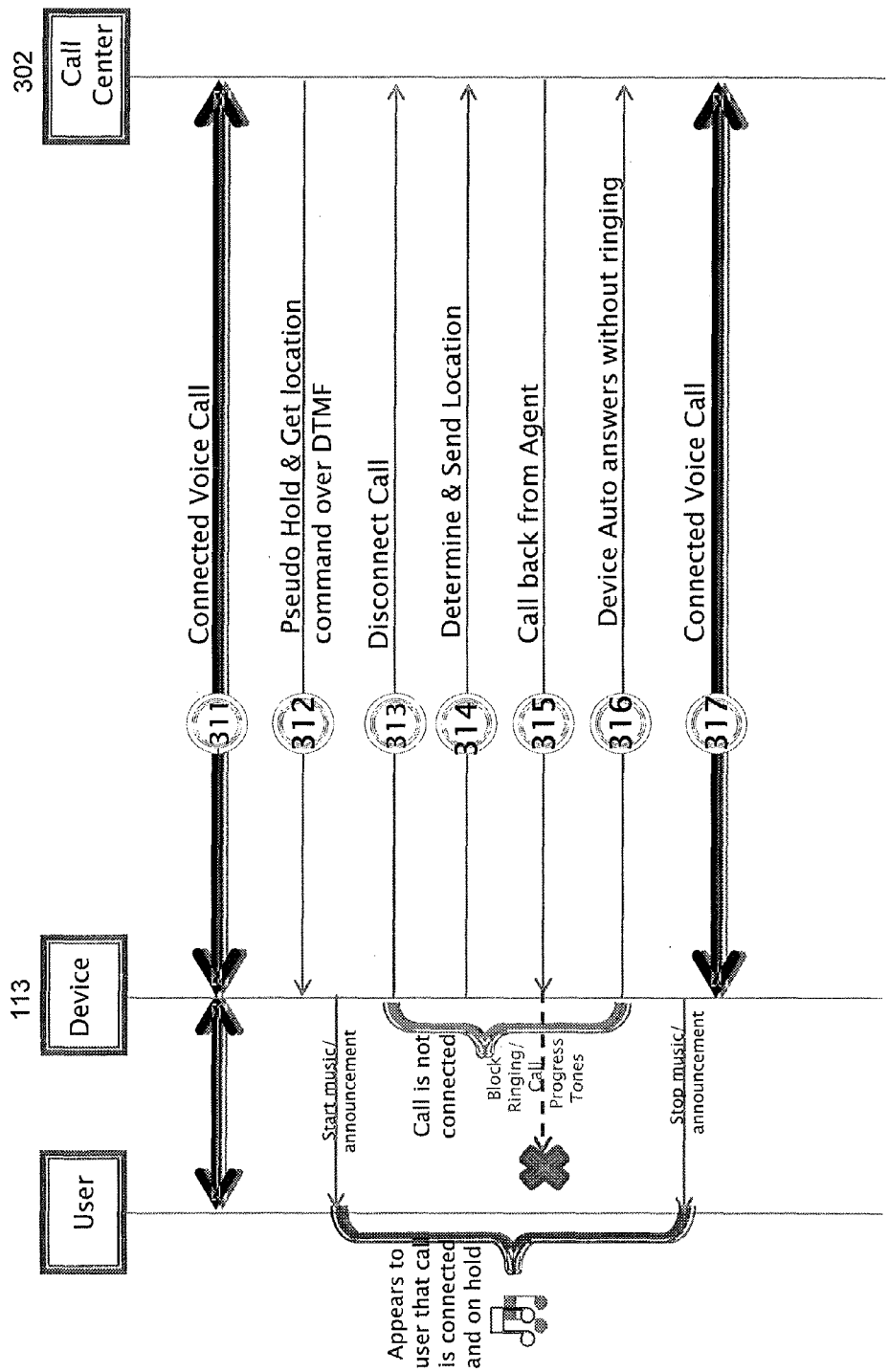
FIG. 3 illustrates a simplified exemplary flow between a mobile device and a call center.

With the foregoing overview of the system, it may be helpful now to consider usage of a pseudo-hold technique to permit functions to be performed and results to be reported using a mobile device that are inconsistent with a voice call initiated through the mobile device. One high-level example includes determining the location of a mobile device 113 in different scenarios. FIG. 3 illustrates a simplified exemplary flow between a mobile device 113 and a call center 302.

In step 311, the wireless device 113 is initially connected with the call center in an end to end voice call. In another example, a voice connection may be initially setup automatically between the wireless device 113 and the call center. This may take place when the wireless device senses a motion (e.g., a sudden acceleration indicating an emergency situation such as a collision or a fall). Alternatively, the voice call may be manually triggered by the user.

During the voice call, the call center personnel may want to determine the location of the mobile device (e.g., to track the location of the user). This request may be generated by the mobile device (when a predetermined criterion is met). For example, the mobile device 113 may periodically send such information to the call center based on a prior configuration of the PERS service. In another example, the predetermined criterion of the mobile device 113 may be a perceived incident (e.g., fall, collision, etc., based on various sensors on the mobile device 113). In another example, the request to determine the location information (and/or to send the location information to the call center 302) may be initiated by the user of the mobile device. In yet another example, the call center 302 itself may initiate the request to receive the location information from the mobile device 113. In this example, an assumption is made that Standalone GPS operation is not appropriate for reasons discussed above. In this regard, Assisted GPS (AGPS) would be more appropriate to determine the location of the mobile device. However, since there is a voice call in progress, whether or not a completed connection to the call center has been established, such GPS assistance cannot be readily provided. In yet another example, the call center may want to access physiological or environmental data for the caller that is available through the mobile device but that cannot be accessed while the voice call is active. In this instance, the call center may initiate a pseudo-hold operation, and while the voice call is temporarily terminated by the pseudo-hold, initiate an Internet Protocol (IP) session with the mobile device to access the physiological or environmental data. Example physiological data may include data such as heart rate, blood pressure or blood-sugar level. Example environmental data may include ambient sounds or images from the camera of the mobile device.

In general, the function performed by the mobile device, is not limited to location determination. Rather, the requests may be for different functions that may be completed by the mobile device. That is, the function may constitute first executing it in the mobile device and, optionally, sending a result to the call center. Alternatively, the function may entail temporarily interrupting a call with another party to perform a function requiring use of the mobile device incompatible with continuing the call, such as determining the health status of the caller or performing an Internet search using the communications channel as an Internet Protocol (IP) data channel. Some example functions are: sending physiological data on the caller that is available through the mobile device, searching the Internet using a mobile web browser, sending an image taken with a camera of the mobile device and sending audio recorded with the mobile device's microphone. For example, the call center of an insurance company may request the mobile device to send an image of a specific incident (e.g., a picture of the user and/or the user's damaged property to an insurance adjustor at the time of an incident). In another example, the call center may request the application running on the mobile device to send recorded sound of an emergency incident at the time of the incident.

In step 312, the call center 302 issues a command to the mobile device from the call center application portal to determine the network assisted location (AGPS) of the mobile device 113. For example, the request is translated into a Dual tone multi frequency (DTMF) command, which is a tone played in the voice channel for the device. The DTMF command, may be a combination of keys, for example, '*80'. Different combinations of keys may execute different functions in the mobile device. These functions may include initiating the pseudo-hold mode, acknowledging receipt of a pseudo-hold command and acknowledging termination of a pseudo-hold mode. The acknowledgements may be generated automatically by the application running on the mobile device, without user interaction. The key combinations sent between the call center and the mobile device may be audible to the user or may be masked by the application running on the mobile device. To prevent accidental initiation of a pseudo-hold, these codes may be longer and include multiple instances of the special tones such as "*"and "#,"

In step 313, upon receiving such a command, an application on the mobile device 113 enters a "pseudo hold," in which the voice call is temporarily terminated. In one example, music played on the mobile device 113 and/or an announcement is displayed on a user interface of the mobile device (e.g., "please hold while we determine your location"). In the background, the call is actually severed. However, the severed call is not apparent to the user of the mobile device 113. Instead, although the call is terminated by the call center or the application on the mobile device, it appears that the voice call is ongoing—but on hold—while the device is determining the location information and sending it to the call center. This increases the convenience of the mobile device because the call is terminated and reestablished without user intervention, allowing the device to automatically interrupt a call to perform a function and then automatically resume the call. The entire process is essentially transparent to the user. Although the call is actually severed, the user may also be urged not to "disengage" the call by audio message provided locally by the application to the user during the time that the voice call is terminated.

In step 314, once the application on the mobile device 113 determines that the call has been terminated, the application causes the mobile device 113 to initiate an AGPS Mobile Station Based (MS-B) location request to the Position Determining Entity (PDE) 174 (e.g., the network server that assists in the location determination). Again, AGPS is made possible because the communication channel is now clear due to the "pseudo hold" in effect. Accordingly, the communication between the mobile device and PDE may be via an Internet protocol (IP) session, for example, using a secure hypertext protocol (https). Once the location (i.e., position of the mobile device 113) is determined by the mobile device 113 or a server in the network, a connection to the call center is set up and the location information is sent via the IP session to the call center 302. If the location is determined by the network server, it may be sent directly from the server to the call center so that the pseudo-hold may be terminated earlier.

In step 315, upon receiving the location information of the mobile device 113 (e.g., from the mobile device 113 over the IP channel), the call center 302 (e.g., in the call center application portal) initiates a call back to the mobile device 113. In one example, the call center, based on the user identification (e.g., a mobile device number MDN), performs a lookup for the device in the database of the server. Once a match is obtained, the call center then places the call to the specific device accordingly. This call placement is transparent to the user of the mobile device 113—i.e., the user does not know that the call was severed and reestablished. The location information may be matched with the mobile device 113 using a unique identifier associated with the mobile device 113 in the communication to the call center 302. The location information may further be stored in a server associated with the call center 302 for retrieval/automatic association with the call back to the mobile device 113 and display on a screen of a call center agent. This information may be used instead of using the location determination process described above if it is not stale (e.g., if the user is calling back within a short time period and there is no indication that the mobile device has been moved). The call center personnel may make this determination rather than the mobile device (or the application running on the mobile device may automatically determine that the previously supplied location can still be used and act appropriately).

The receipt of the location information may signal the call center that the pseudo hold is to be terminated. Alternatively, the mobile device 113 may send a separate signal to the call center to terminate the pseudo hold. If the call is between the mobile device 113 and another mobile device (not shown), a message, sent via the IP session, signaling that the function is complete may be sent between the mobile devices to indicate that the pseudo hold should be terminated.

In step 316, upon receiving the call, the call control application on the mobile device 113 automatically answers the call without an overt indication to the user (e.g., ringing the device or displaying any incoming call related indications). In one implementation, the application running on the mobile device may know the CID of the call center and, when the mobile device is in pseudo-hold mode, may examine the CIDs of incoming calls. When a call having the CID of the call center is received the application may automatically answer the call, and then terminate the pseudo-hold mode. Calls having other CIDs may be ignored by the application while the mobile device is in pseudo-hold mode.

For example, the time that a device may be in the pseudo-hold mode may be limited. Within that limited time, the device may only receive calls associated with the call center (e.g. having the known CID of the call center). As such, an indication in the mobile device of a call from the center, may not be necessary. However, upon an expiration of the limited time, the mobile device may again receive incoming calls and an indication of such calls. In step 317, the user continues the voice call on his/her mobile device 113. Thus, the location information of the mobile device 113 is determined and provided to the call center 302 without substantially interfering with an ongoing call. In various embodiments, the application may stop the mobile device 113 from responding to any incoming calls and/or the network block calls to the mobile device 113 in the event that calls are made to the mobile device 113 during the time period when the communication channel is not in use. For example, the mobile device, while in the pseudo-hold mode, may send a signal to the network indicating that it is in the pseudo-hold mode. The network may then respond to the signal by rejecting any incoming call directed to the mobile device. In another example, the network may divert the incoming calls directly to a voice mail box of the mobile device.

In general, the user interface of the mobile device indicates that the device is free to make another call even when engaged in a voice call. However, upon entering the pseudo hold mode, the device may execute a function (e.g., browsing the internet), as described above, and may need to use an IP data channel. Sending data over the IP data channel to the call center may conflict with the operation of the voice call. The voice call and the IP data channel may not operate simultaneously. As such, during the pseudo-hold mode, the voice call may be terminated for the data transmission.

In one aspect, both GPS and AGPS approaches may not provide an efficient way of determining the location of a mobile device. For example, the mobile device 113 may be in a building. Thus, any satellite GPS signal may not effectively reach the mobile device and any additional assistance through an AGPS may fail. In this regard, the source generating a supplemental position determination signal may include a pilot beacon 402 transmitter. The pilot beacon 402 transmitter may be deployed inside an area having an obstructed view of sky to improve the location determination capability within the area. For example the pilot beacon 402 may be a docking station with wireless capability. The concepts embodied herein are also applicable in emergency situations. In one example, such monitoring may be part of a Personal Emergency Response System (PERS) that can be used for monitoring the location of subscribers and to respond to emergencies identified by the mobile device 113. For example, an emergency call signaled by a PERS subscriber with their mobile device (e.g., a mobile device 113) goes through several steps until the location of the mobile device is determined. In one example, the PERS system includes the mobile device 113, a coarse positioning process (e.g., similar to non-PERS 911 calls), a standalone position determining process, a more accurate AGPS position determining process, and verbal communication between PERS subscriber, a call center agent, and, sometimes, a Public Safety Answering Point (PSAP) Call Taker and/or other emergency medical service (EMS) personnel.

Figure 4:
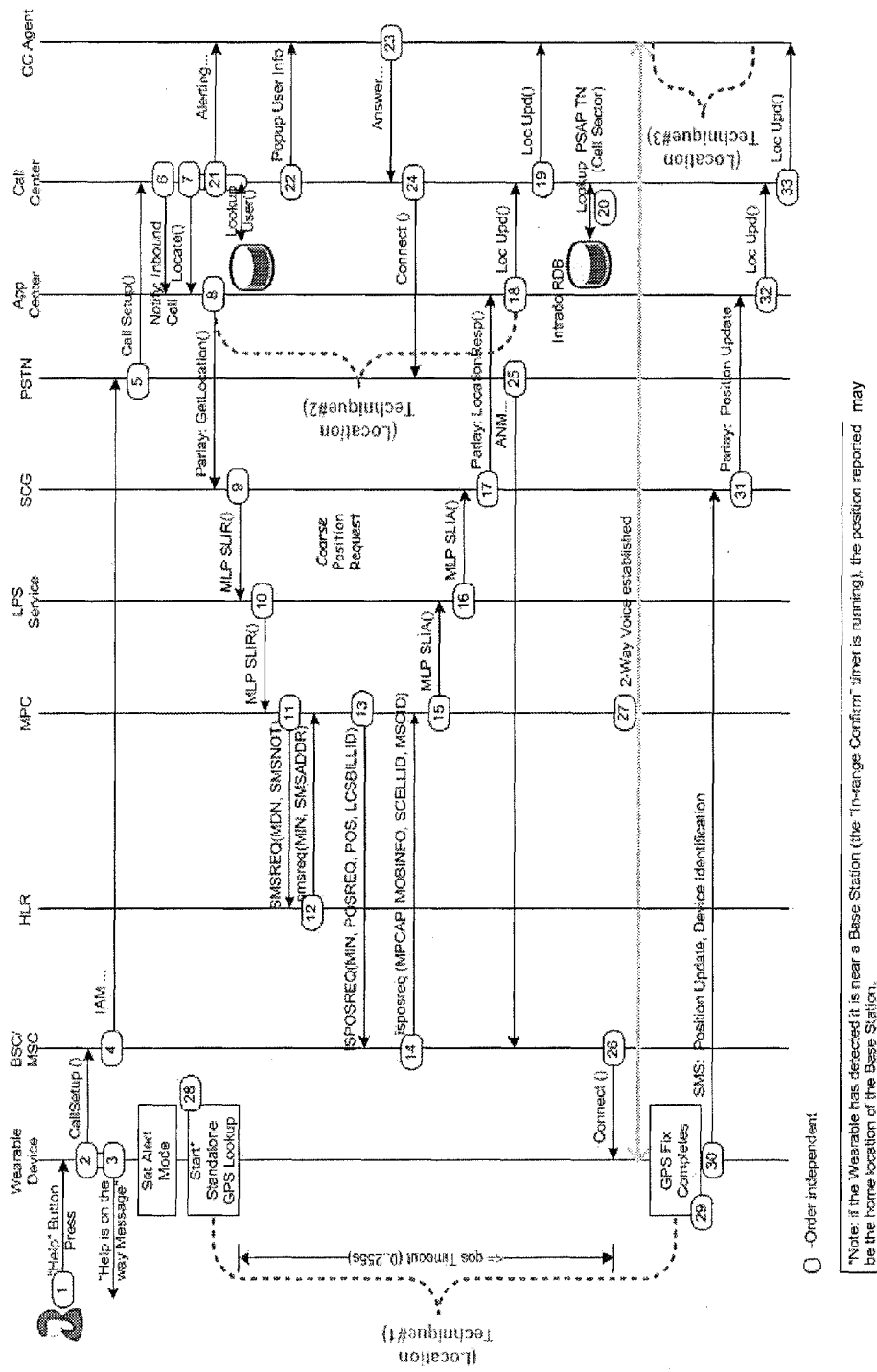
FIG. 4 illustrates an exemplary emergency call flow for a coarse location determination.

For example, four main position determining steps are used to determine the location (e.g., position information). Some of the factors for accuracy/responsiveness include the number of GPS satellites the mobile device 113 is in communication with, signal strength of the GPS signals, the proximity to the BS 119, and the time available for call center agent to assess and help with a developing situation. FIG. 4 illustrates an exemplary emergency call flow utilizing a pseudo-hold mode. The system shown in FIG. 4 includes a base station controller/mobile switching center (BSC/MSC), a home location register (HLR), a mobile positioning center (MPC), a local positioning system (LPS), a service control gateway (SCG), a public switched telephone network (PSTN), an application center, a call center staffed by a call center (CC) agent.

In step 1, the user invokes help from a PERS. For example, the user may press a "Help" button on their PERS wearable device or mobile device 113. A program in the mobile device 113 initiates the alerting sequence upon determining that the "Help" button has been pressed. In other examples, help is invoked through an audio input, by moving the device in a predetermined way (e.g., shaking it several times in a predetermined manner) or any combination thereof. In one example, the mobile device 113 triggers the help alert automatically upon determining that a predetermined event has occurred, such as an collision, fall, heart attack or other emergency, based on various sensors in or connected to the mobile device 113.

In steps 2 to 3, the mobile device 113 initiates call setup. For example, the mobile device 113 dials the Call Center toll-free 800 number. The user may be informed that a call is in progress on a display of the mobile device 113. The mobile device 113 is now in the "Alert" state. The "Alert" state is cleared when the emergency call is eventually resolved (i.e., step 74 of FIG. 5).

In steps 4 to 5 the wireless network relays call to the PERS call center 302 using an initial message address (IAM). For example, the help request is relayed to the call center using normal wireless network signaling and the Public Switched Network (PSTN) where an automated Call Center answers the call.

In step 6, the App Center state is updated. For example, the Call Center updates the status of the user to an "Inbound Call State." The App Center manages the status of the request from the mobile device 113 by receiving events describing the state of the call, actions by the Call Center Representative, and process automation created by the App Center itself.

Next, the Coarse position is requested (i.e., steps 7 to 20) using a mobile location protocol (MLP) standard location immediate request (SLIR) to the LPS and then to the MPC, where it is imbedded in an short messaging service request (SMSREQ) and transmitted to the HLR. The MPC also handles billing with the BSC/MSC. The location information is returned to the SCG using MPL SILA messages. For example, the Call Center automation sends a "Locate user" request to the App Center 142. This request is an independent process that is performed in the network and proceeds concurrently with the activity of the mobile device (i.e., steps 28-30) and by the Call Center Agent (i.e., steps 21-27). When the sequence completes, the Agent has the user personal information and a coarse location (Cell Sector address) of the PERS subscriber that can be used to select a Public Safety Answering Point (PSAP) later in the call, if necessary. In step 20 the PSAP telephone number available by the Call Center automation.

In steps 21 to 22, the Call Center Agent is alerted and informed about the situation. While the Coarse position request is in progress, the Call Center Automation relays the PERS subscriber's call to an Agent (e.g., human). As the agent is alerted, the inbound call process performs a database lookup for the user information (based on originating Telephone number). The retrieved information is presented to the Call Center Agent to which the call is directed.

In steps 23 to 27, the Call Center Agent establishes communication with user (i.e., bearer of the mobile device 113). For example, the Call Center Agent received the user information (i.e., back in step 22) and now accepts the incoming call. The call completes and the Call Center Agent has a 2-way voice call established (i.e., step 27).

In steps 28 to 33, the mobile device performs a GPS Fix (i.e., using standalone GPS) and provides the results. Following the originating call (i.e., step 01) the mobile device 113 informs the user that their request is being processed. The device then starts a process to determine the location of the mobile device using standalone GPS (i.e., step 28). This step is concurrent with the in-network coarse positioning request and the Voice call establishment. If the mobile device 113 determines that it is within range of the user's cradle (i.e. if the mobile device receives a signal from the cradle, even if that signal is not sufficient to establish a communications channel), the mobile device 113 reports the location provided by the cradle (e.g., home).

Figure 5:
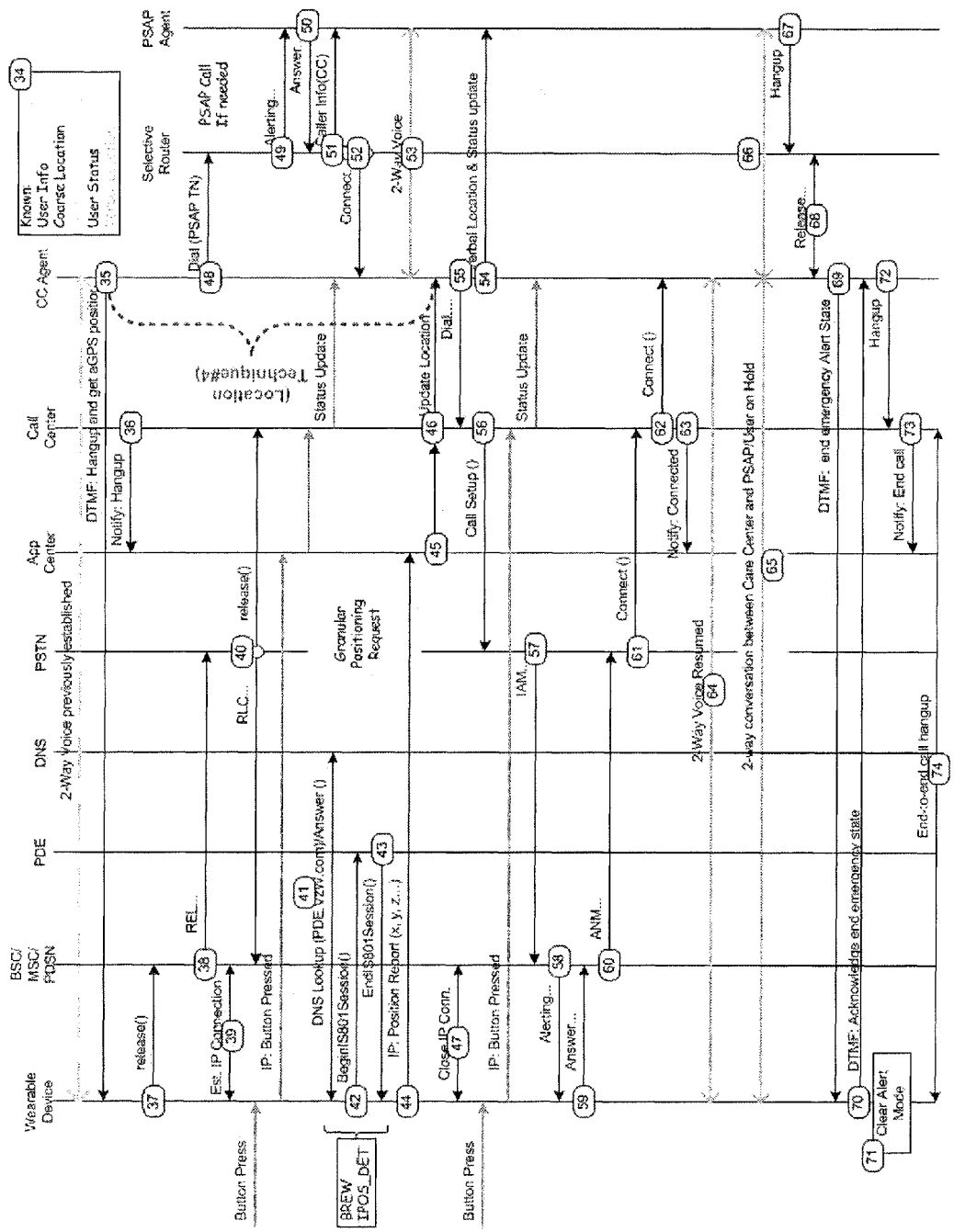
FIG. 5 illustrates an exemplary call flow performed after a coarse location determination and voice call is established.

Reference now is made to FIG. 5 which illustrates an exemplary call flow that is performed after a coarse location determination and voice call establishment. In addition to the communications elements shown in FIG. 5, FIG. 5 includes packet data switched network (PDSN), shown combined with the BSC/MSC, a position determining entity (PDE) and a domain name server (DNS).

At step 34, several assumptions are made: (i) the user and the Call Center Agent have established a 2-way Call; (ii) the Call Center Agent has the user personal data as well as a coarse location information (including the appropriate PSAP call number); and (iii) there is some assessment of the status (e.g., general location, possible condition, etc.,) of the user. The Agent may have a standalone GPS fix or home location in hand. If the home location was provided by the mobile device 113, the Agent has accurate location information. For example, the quality of the alternative GPS fix depends on the number and quality of the satellite signals it used for its location determination.

Steps 35 to 77 are with respect to a "Granular Positioning Request." For example, if the Call Center Agent requests more precise location information than what is provided by the mobile device 113, the Agent can send an in-band command (i.e., step 35) to the mobile device 113 to release the ongoing call and initiate an assisted GPS (AGPS) location determination. This request is, thus, made only after it is determined that the mobile device 113 is not at the home location and that it cannot determine its location using standalone GPS. The mobile device may not be able to use standalone GPS if it cannot identify a sufficient number (e.g. 4) of satellites having sufficient signal strength. The aiding information provided to the mobile device using AGPS includes almanac and ephemeris data that allows the GPS receiver in the mobile device to process weaker satellite signals than it may be able to process in a standalone mode. As discussed above, the user of the mobile device 113 does not realize that the call has been released. Instead, in one example, the user may experience a brief pause and a notification on a user interface of the mobile device 113 that a location determination is in progress. Accordingly, the mobile device is in a "pseudo-hold" mode.

In steps 37 to 40, the mobile device 113 releases the call to free up the CDMA radio channel for the IP session with the network-based Position Determining Equipment (PDE) (i.e., steps 41-47). In step 41, the mobile device 113 locates the proper PDE. Steps 42 to 44 represent the IS-801 session with the PDE to exchange GPS timing information and use the PDE to calculate a more precise position (i.e., location information). Communications between the mobile device 113 and the PDSN in steps 41-43 is via a binary runtime environment for wireless (BREW) protocol.

In steps 48 to 54, the Call Center Agent contacts emergency services. For example, if the user's physical health status warrants (e.g., as determined by the Agent (in Step 27) or the mobile device), the Agent may call the PSAP (determined in previous step 20). Thus, the Call Center Agent can relay the status and location of the PERS user to the PSAP operator.

In steps 55 to 66, the voice call is re-established with the mobile device 113 (which is transparent to the user, i.e., without an indication in the user interface, as described above). Put differently, the mobile device 113 exits the "pseudo-hold" mode. For example, the Call Center Automation re-establishes the voice communication with the PERS user when it receives the final "Update Location" response from the Granular positioning request (i.e., steps 35-47). The mobile device 113 is stateful, that is, the mobile device is aware of its current state. As such, the mobile device will answer the incoming call silently to reconnect with the PERS user within a predetermined time (as described above). The App Center has its user state updated to "Connected" when the newly established call is completed. In one example, the Call Center Agent has the capability to create a conference call with the PSAP Call Taker and the PERS user to discuss the situation (i.e., steps 65 to 66).

In steps 67 to 74, the help call is released and the emergency call status is cleared. For example, following resolution of the Help request, the PSAP Call Taker releases the call (i.e., steps 67-68), and the Call Center Agent sends a command to the mobile device 113 to end the emergency Alert state (i.e., step 69). In this regard, in step 70, the mobile device 113 responds with an acknowledgement message. In step 71, the Alert state on the mobile device is cleared. In step 74, the mobile device hangs-up its end of the call. In step 73, the App Center is notified of the 'End Call' state following the Agent hang-up (i.e., step 72).

In one example, once an emergency call is placed through a mobile device 113, the connection between the mobile device 113 and the call center is not severed until predetermined criteria are met. The mobile device 113 can place and end the call automatically without requiring user intervention, and the user may not be able to terminate the call without a determination, at the call center, that the event which precipitated the call has been resolved. For example, in an emergency scenario, even if a user accidentally presses the "end-call" button, personnel at the call center may inhibit termination of the call until they are satisfied that the emergency is resolved. This feature ensures that a communications channel is maintained even when a user is not able to establish or reestablish a connection (e.g., due to an injury).

It may be useful to consider the functional elements/aspects of an exemplary mobile device, at a high-level. The mobile device may use an application to implement the pseudo-hold operation. During this operation, the mobile device can be instructed to hang up the call to the other party, but not reveal this to the user, to execute alternative functions while the call is hung up, the mobile device can relay data input by the user (e.g. button presses) while the device is hung up, the mobile device can block incoming connection attempts from non-call center sources; and the mobile device can accept the return call from the call center without alerting the user. All of these operations are performed seamlessly.

Figure 6:
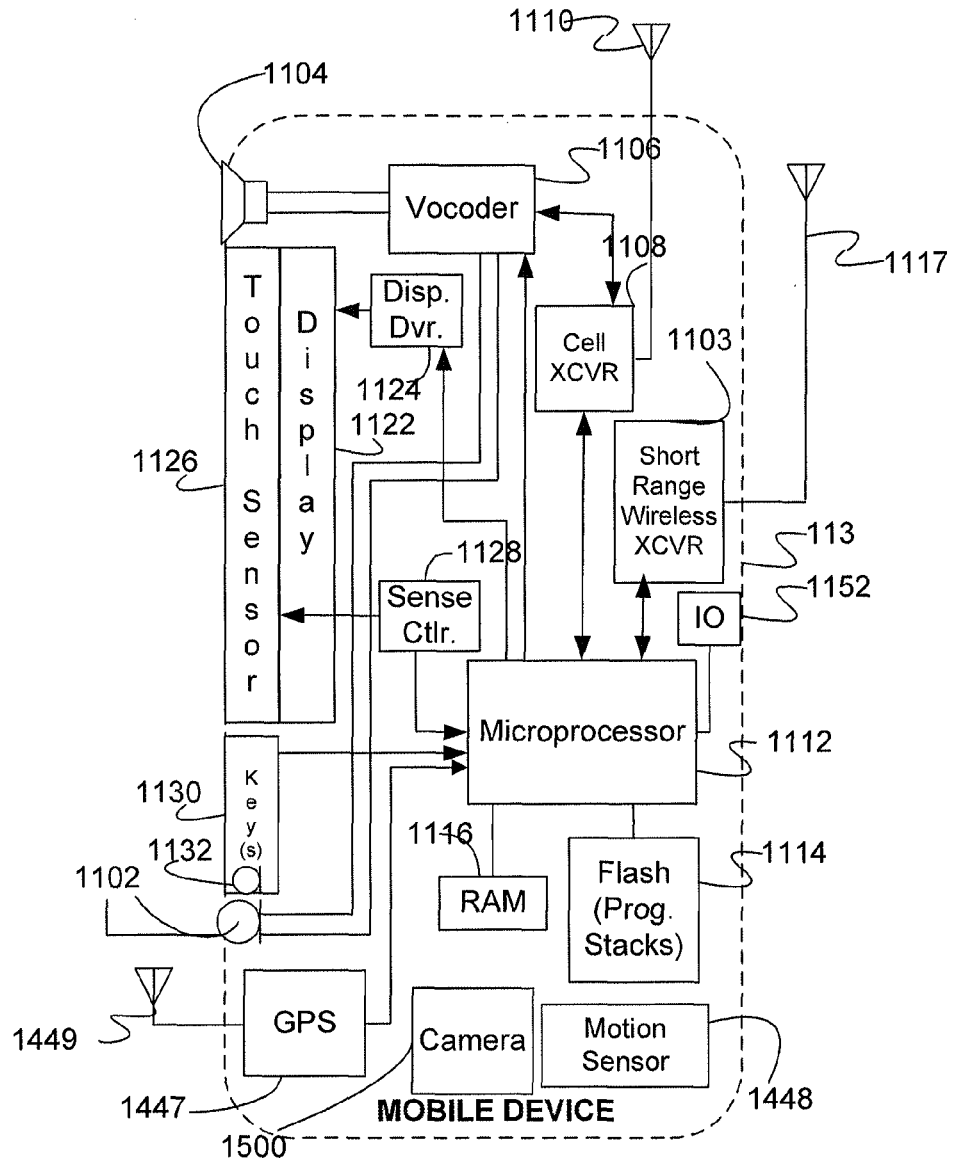
FIG. 6 illustrates a high level simplified function block diagram of an exemplary mobile device.

For purposes of this discussion, FIG. 6 provides a block diagram illustration of an exemplary mobile device 113. Although the mobile device 113 may be a handset type mobile phone or may be incorporated into another device, such as a personal digital assistant (PDA), a tablet computer, a PERS wearable device, or the like. For discussion purposes, the illustration shows the mobile device 113 in the form of a handheld smart-phone. The smart-phone example of the mobile device 113 may function as a normal digital wireless telephone station. The mobile device 113 includes a display 1122 for displaying messages, location information, pseudo-hold messages, or the like, call related information dialed by the user, calling party numbers, etc. The mobile device 113 also includes a touch/position sensor 1126. The sensor 1126 is relatively transparent, so that the user may view the information presented on the user output (i.e., display) 1122. A sense controller 1128 sensing signals from elements of the touch/position sensor 1126 and detects occurrence and position of each touch of the screen formed by the display 1122 and sensor 1126. The sense circuit 1128 provides touch position information to the microprocessor 1112, which correlates that information to the information currently displayed via the display 1122, to determine the nature of user input via the screen.

The display 1122 and touch sensor 1126 (and possibly one or more keys 1130, if included) are the physical elements providing the textual and graphical user interface for the mobile device 113. The microphone 1102 and speaker 1104 may be used as additional user interface elements, for audio input and output. Of course, other user interface elements may be used, such as a trackball, as in some types of smart phones or tablets. As such, a smart button may be implemented by key 1132 or upon a combination of 1122 and 1126 forming a touch sensitive display of the mobile device 113. In addition, camera 1500 may be used to capture images and videos. It is contemplated that the mobile device may include an input/output interface, 1152, which may be connected to an external monitoring device, such as a heart monitor, blood pressure monitor, blood sugar monitor or other physiological or environmental sensor, to automatically initiate an emergency call to the call center when signals from the heart monitor indicate the occurrence of an emergency event, such as a heart attack. Alternatively, these signals may be conveyed from the heart monitor to the mobile device via the short-range transceiver 1103.

For digital wireless communications, the mobile device 113 also includes at least one transceiver (XCVR), such as cellular transceiver 1108 and short range wireless transceiver 1103. The concepts discussed here encompass examples of the mobile device 113 utilizing any digital transceivers that conform to current or future developed digital wireless communication standards.

The transceiver 1108 provides two-way wireless communication of information, such as vocoded speech samples and/or digital message information, in accordance with the technology of the network 121. In this case, the transceiver 1108 also sends and receives a variety of signaling messages in support of the various voice and data services provided via the mobile device 113 and the wireless communication network 121. Transceiver 1108 connects through RF send and receive amplifiers (not separately shown) to an antenna 1110. In the example, the transceiver 1108 is configured for RF communication in accord with a digital wireless protocol, such as the CDMA and 3GPP protocols and/or 4G protocols.

Similarly, short range wireless transceiver 1103 is configured to send and receive a variety of signaling messages in support of the various voice and data services provided via the pilot beacon 402 and its corresponding in home wireless network, as discussed above. Transceiver 1103 connects through send and receive amplifiers (not separately shown) to an antenna 1117.

The mobile device 113 also includes a GPS receiver 1447 for communicating with satellites via antenna 1449. The mobile device 113 may also include a haptic element (not shown) to provide haptic feedback to the user. Various combinations of the keypad 1120, display 1122, microphone 1102, haptic element, and speaker 1104 may be used as the physical input output elements of the graphical user interface (GUI), for multimedia (e.g., audio and/or video) communications. Of course other user interface elements may be used, such as a stylus and touch sensitive display screen, as in a PDA, tablet computer, PERS wearable device, or smart phone. In addition to normal telephone and data communication related input/output (including message input and message display functions), the user interface elements also may be used for display of notifications and other information to the user and user input of selections, for example, including any needed to place emergency calls and/or determine location. Additional sensors, such as an accelerometer, gyroscope, compass, light sensor, and barometer may also be included in the motion sensor 1448 of the mobile device 113. For example, the combination of sensor information helps determine (i) whether the user of the mobile device is in an emergency situation and (ii) whether the user may need help.

In the example of FIG. 6, a microprocessor 1112 serves as a programmable controller or processor, in that it controls all operations of the mobile device 113 in accord with programming that it executes, for all normal operations, and for operations involved in receiving/determining/transmitting location information and communicating with emergency services. In the example, the mobile device 113 includes flash type program memory 1114, for storage of various "software" or "firmware" program routines and mobile configuration settings, such as mobile telephone number (MTN or MDN), etc. The mobile device 113 may also include a non-volatile random access memory (RAM) 1116 for a working data processing memory. In a present implementation, the flash type program memory 1114 stores firmware such as a boot routine, device driver software, an operating system, call processing software and vocoder control software, and any of a wide variety of other applications, such as client browser software and short message service software. The memories 1114, 1116 also store various data, such as telephone numbers and server addresses, downloaded data such as multimedia content, and various data input by the user. Programming stored in the flash type program memory 1114, sometimes referred to as "firmware," is loaded into and executed by the microprocessor 1112. Accordingly, the mobile device 113 includes a processor, and programming stored in the flash memory 1114 configures the processor so that the mobile device is capable of performing various desired functions, including determining location information from GPS satellites and receiving assistance through AGPS, and the like.

As discussed above, functions relating to monitoring location information and providing assistance in determining the location information can be performed on one or more computers connected for data communication via the components of a packet data network, including mobile devices, in accordance with the methodology of FIG. 3. An exemplary mobile device 113 has been discussed above with respect to FIG. 6. Although special purpose devices may be used as the server (s), for example for any of the servers in FIGS. 1 and 2, such devices also may be implemented using one or more hardware platforms intended to represent a general class of data processing device commonly used to run "server" programming so as to implement the functions discussed above, albeit with an appropriate network connection for data communication.

Figure 7:
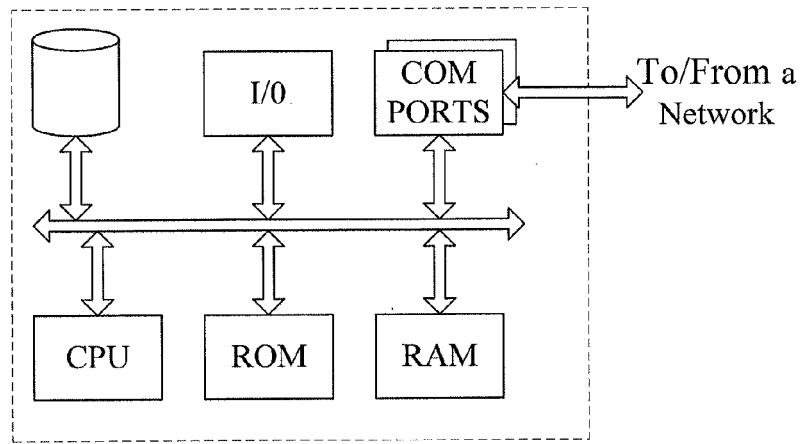
FIG. 7 illustrates a network or host computer.
Figure 8:
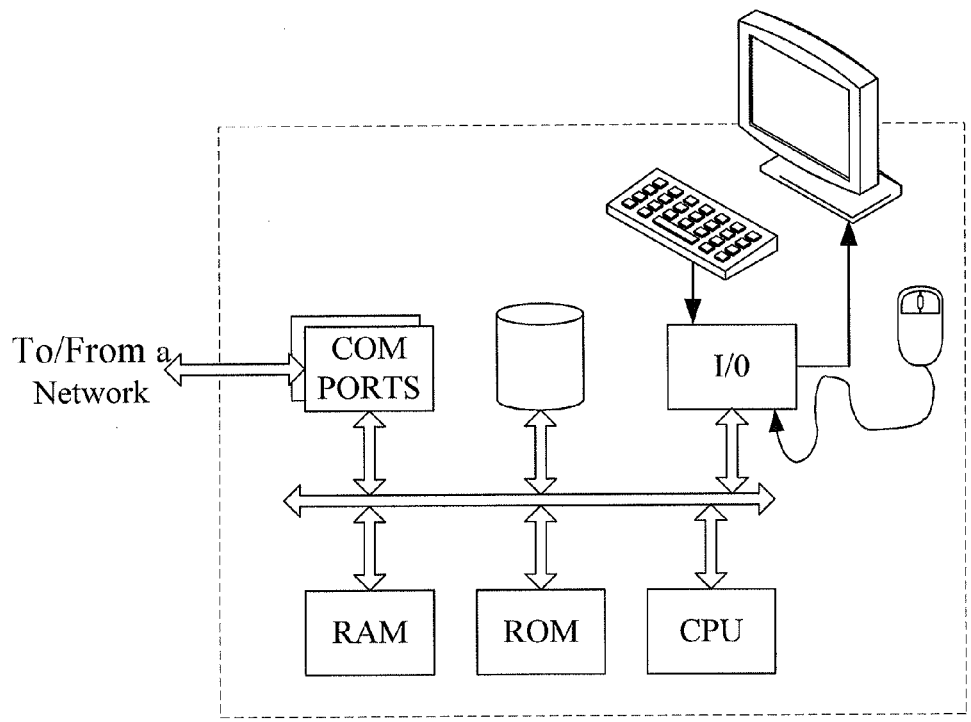
FIG. 8 depicts a computer with user interface elements.

FIGS. 7 and 8 provide functional block diagram illustrations of general purpose computer hardware platforms, as might be used as any of the servers discussed in the context of FIGS. 1 and 2, or other computers discussed in the examples above. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that programming and general operation of such computer equipment, and as a result the drawings, should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

One embodiment of the invention is a UE device comprising at least one network interface, configured to support connection via a communication network; and a processor coupled to the network interface configured to cause the UE device to perform operations, including operations to establish a voice call with a further UE device; send a request for a function inconsistent with the voice call to the further UE device; send a first command to the further UE device for the further UE device to enter a pseudo hold mode; sever the voice call without the user of the UE device being notified; perform a function inconsistent with the voice call; upon completion of the function, reestablish the voice call with the further UE device; and send a second command to the further UE device to terminate the pseudo hold mode.

Another embodiment of the invention is a call center server comprising at least one network interface, configured to support connection via a communication network; and a processor coupled to the network interface configured to cause the call center server to perform functions, including functions to establish a voice call by a call center with a user equipment (UE) device; receive a request to initiate a pseudo hold mode on the UE device; send a first command to the UE device for the UE device to enter a pseudo hold mode sever the voice call without a user of the UE device being notified; receive a message indicating completion of the function, upon completion of the function, while the UE device is in the pseudo hold mode; reestablish the voice call with the UE device.

For example, aspects of the methods determining location information of a mobile device and providing assistance in emergency situations, as outlined above, may be embodied in programming for a server and programming for a mobile device. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    connecting, by a user equipment (UE) device, the UE device to a call center via a voice call;
    receiving, by the UE device, a request for a current location of the UE device;
    initiating, by the UE device, a pseudo hold mode responsive to the request by temporarily severing the voice call and, while in the pseudo hold mode, the UE device:
        causing the current location of the UE device to be sent to the call center;
        receiving a plurality of incoming calls;
        determining a caller identification (CID) number associated with each of the incoming calls;
        blocking each of the incoming calls for which the CID number does not correspond to a CID number associated with the call center;
        identifying, based on the CID number associated with the caller, one of the incoming calls to be a call back that is received from the call center in response to the call center receiving the current location of the UE device;
        answering the call back automatically; and
        terminating the pseudo hold mode to resume the voice call of the UE device to the call center via the answered call back.

2. The method of claim 1, wherein the initiating the pseudo hold mode further includes indicating via an output of the UE device that the voice call is on hold while in the pseudo hold mode without notifying a user of the UE device of the temporary severing of the voice call.

3. The method of claim 1, wherein the answering the call back automatically includes performing the answering without providing a notification via an output of the UE device of the call back.

4. The method of claim 1, wherein the resuming the voice call includes reconnecting to the call back without user intervention.

5. The method of claim 1, wherein blocking each of the incoming calls for which the CID number does not correspond to a CID number associated with the call center comprises diverting the blocked calls directly to voicemail while the UE device is in the pseudo hold mode.

6. The method of claim 1, wherein the causing the current location to be sent to the call center further includes determining, by the UE device, one or more locations according to occurrence of a predetermined event sensed using the UE device.

7. The method of claim 6, wherein the determining the one or more locations includes a lookup of a last stored location information, prior to causing the last stored location information to be sent to call center as the current location of the UE device.

8. The method of claim 1, wherein the connecting the UE device to the call center is responsive to a signal in the UE device, indicating an emergency condition, causing the UE device to enter an alert state.

9. A user equipment (UE) device comprising:
    at least one network interface, configured to support connection via a communication network; and
    a processor coupled to the network interface configured to cause the UE device to perform functions, including functions to:
        connect a voice call to a call center via the communication network;
        receive, from the call center, a request for the UE device to perform a function that is incompatible with the voice call;
        initiate a pseudo hold mode responsive to the request by temporarily severing the voice call; and, while in the pseudo hold mode:
        perform the function;
        receive a plurality of incoming calls;
        determine a caller identification (CID) number associated with each of the incoming calls;
        block each of the incoming calls for which the CID number does not correspond to a CID number associated with the call center;
        identify, based on the CID number associated with the caller, one of the incoming calls to be a call back that is received from the call center in response to the performance of the function;
        answer the call back automatically; and
        terminate the pseudo hold mode to resume the voice call to the call center via the answered call back.

10. The UE device of claim 9, wherein:
    the processor is further configured to cause the UE device to indicate that the voice call is on hold while in the pseudo hold mode without notifying a user of the UE device of the temporary severing of the voice call.

11. The UE device of claim 9, wherein:
the processor is further configured to cause the UE device to answer the call back automatically without notifying a user of the UE device of the call back.

12. The UE device of claim 9, wherein:
the processor is further configured to cause the UE device to resume the voice call by reconnecting to the call back without user intervention.

13. The UE device of claim 9, wherein:
the processor is configured to send a message to the call center on completion of the function and prior to receiving the call back from the call center.

14. The UE device of claim 9, wherein the processor is configured to block each of the incoming calls for which the CID number does not correspond to a CID number associated with the call center by diverting the blocked calls directly to voicemail while the UE device is in the pseudo hold mode.

15. A method comprising:
receiving, by a call center, a voice call from a UE device via a communication network, wherein the voice call is initiated based on an output signal of a physiological sensor coupled to the UE device, and wherein the output signal indicates a potential emergency condition;
sending, from the call center to the UE device, a command for the UE device to enter a pseudo hold mode;
receiving, at the call center, confirmation of a pseudo hold mode from the UE device:
terminating, by the call center, the voice call with the UE device;
establishing, at the call center, an internet protocol (IP) session with the UE device;
sending, by the call center and via the IP session, a request to the UE device for the UE device to perform a function, wherein the function includes sending physiological data obtained by the physiological sensor;
receiving, at the call center, results of the function from the UE device via the IP session, wherein the results include the physiological data; and
initiating, by the call center, a second voice call to the UE device, in response to receiving the results of the function, to reestablish the terminated voice call.

16. The method of claim 15, wherein:
the sending of the command includes sending a sequence of (dual tone multi-frequency (DTMF) tones; and
the receiving of the confirmation includes receiving a sequence of DTMF tones.

17. The method of claim 15, wherein:
the receiving of the results of the function includes receiving a message, via the IP session, from the UE device indicating completion of the function.

18. The method of claim 15, wherein the physiological data comprises at least one of heart rate information, blood pressure information, or blood-sugar level information associated with a user of the UE device.

19. The method of claim 15, wherein:
the sending of the request for the UE device to perform the function includes sending a request for environmental data; and
the receiving of the results of the function includes receiving the requested environmental data.

20. The method of claim 15, further including:
determining a last known location of the UE device prior to sending the request for the UE device to perform the function; and
determining whether the last known location of the UE device is stale; and
sending to the UE device a request for a current location of the UE device, in response to determining that the last known location of the UE device is stale.

* * * * *